United States Patent [19]
Carlberg

[11] 3,837,899
[45] Sept. 24, 1974

[54] METHOD OF COATING THE INTERIOR SURFACE OF A METAL VESSEL AND THE COATED VESSEL

[75] Inventor: Bobbie L. Carlberg, Ponca City, Okla.

[73] Assignee: Continental Oil Company, Ponca City, Okla.

[22] Filed: June 14, 1972

[21] Appl. No.: 262,893

[52] U.S. Cl.................... 117/92, 117/705, 117/75, 117/97, 117/101
[51] Int. Cl..................... B44d 1/14, B32b 15/04
[58] Field of Search......... 117/75, 92, 101, 705, 94, 117/97

[56] References Cited
UNITED STATES PATENTS

| | | | |
|---|---|---|---|
| 549,342 | 11/1895 | Ward et al. | 117/92 |
| 1,555,257 | 9/1925 | Talbot | 117/92 |
| 1,889,644 | 11/1932 | DeLa Roche | 117/92 |
| 2,248,098 | 7/1941 | Cornelius et al. | 117/95 |
| 2,727,832 | 12/1955 | Christensen et al. | 117/92 X |
| 3,357,851 | 12/1967 | Montgomery | 117/75 X |
| 3,689,305 | 9/1972 | Hausmann | 117/75 X |

Primary Examiner—Ralph Husack
Attorney, Agent, or Firm—Gerald L. Floyd

[57] ABSTRACT

Method of coating the interior surface of metal vessels with a first coating of a mastic-like material and second coating of a hydraulic cement.

3 Claims, 2 Drawing Figures

METHOD OF COATING THE INTERIOR SURFACE OF A METAL VESSEL AND THE COATED VESSEL

BACKGROUND OF THE INVENTION

1. Field of the Invention

This invention relates to an improved corrosion resistant coating composition for metal members having an exterior and interior surface such as vessels, reactors, conduits and the like, hereinafter referred to as vessels.

2. Description of the Prior Art

It has long been known to coat vessels which are used to contain or handle liquids or gases with a material which is less susceptible to attack by, or otherwise less adversely affected by, the liquids or gases than the material of construction of the vessel itself. One coating method is the lining with hydraulic cement of the interior of conduits used to convey fluids which are corrosive or otherwise detrimental to the conduit material, usually a metal. In the centrifugal coating method, a slurry of the hydraulic cement is introduced into the conduit and the conduit rotated about its longitudinal axis to distribute the cement evenly over the interior thereof. Rotation of the conduit is continued for a sufficient length of time to allow the cement slurry to achieve a partial set so that it is self-supporting. The rotation is then stopped and the cement allowed to cure to a final set.

Cement, while relatively inert to many fluids that are corrosive to metal conduits has certain disadvantages as a coating material. Cement, while quite strong in compression, is weak in tension. Consequently, handling damage, especially formation of cracks, is common unless extreme care is used in implacing and curing the cement as well as transportation and installation of the relatively thinly coated conduit. For the most part, these are hairline cracks with fine capillary dimensions. However, should the lining be placed under tension, as when the conduit is installed on uneven terrain, is bent to conform to a certain shape, is dropped during handling, and so forth, even these hairline cracks open to greater dimensions. When a fluid is placed in or passed through the conduit it can penetrate these cracks or other disconformaties and contact the underlying conduit.

It is one object of this invention to provide an improved coating composition for metal vessels. It is an object to improve the bond of cement lining to conduits. It is a further object to provide a corrosion resistant layer between a cement lining and the conduit which is lined. It is a still further object to decrease any void space existing between a cement lining and the conduit due to the method of forming the lining or handling of the conduit after it has been lined. Other objects, advantages and features of the invention will become apparent from the following discussion and appended claims.

SUMMARY OF THE INVENTION

This invention involves a method of providing a coating composition for metal vessels comprising:

a. applying to said surfaces a first coating of a relatively thin layer of a thermoplastic or mastic-like material such as coal tar, asphalt, epoxy resin and the like, and b. applying to the coated surfaces a second coating of a hydraulic cement.

DESCRIPTION OF THE PREFERRED EMBODIMENT

Figure 1:
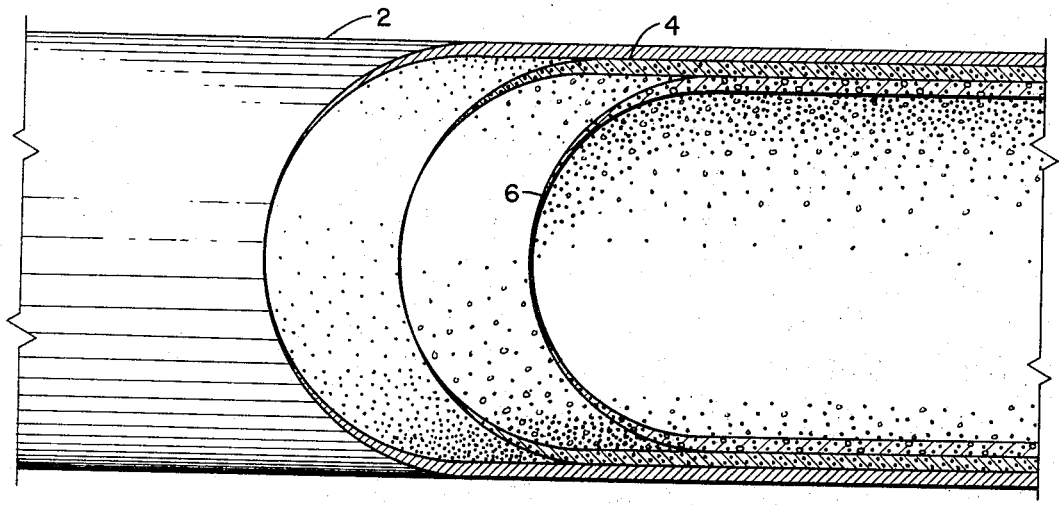
FIG. 1 is a cross-sectional view of a section of a metal pipe having a mastic-like coating and a cement coating installed therein.
Figure 2:
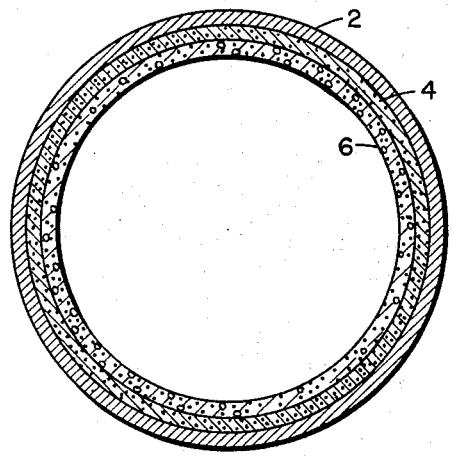
FIG. 2 is the end view of the metal pipe represented in FIG. 1.

Referring now to the drawings, a metal conduit 2 is provided with an internal coating of a mastic-like material 4 as by spraying or painting. A coating of a hydraulic cement 6 is then applied on top of the coating of mastic-like material 4 by positioning a slurry of hydraulic cement 6 inside metal conduit 2, rotating metal conduit 2 about its longitudinal axis to distribute the slurry evenly and until the slurry has at least partially dewatered and achieved a partial set, stopping the rotation and curing the coating of hydraulic cement 6. The coated conduit is then ready for service.

Various vessels used to contain or transport fluids can be coated according to the process of this invention. Of particular interest are metal conduits used to transport aqueous systems which are detrimental to the metal forming the conduit. Other metal vessels include tanks, vats and similar receptacles. If the vessel surface to be coated is clean, no treatment is required prior to coating. If the surface is dirty or contains scale or other foreign substances, it is preferable to clean the surface prior to applying the coatings, as by the use of solvents, scraping, sandblasting and the like.

The first coating to be applied must provide a waterproof membrane between the metal vessel and the subsequently applied cement coating. This first coating must adhere well to the metal and should not interfere with the setting of the cement slurry which will be applied over it. The first coating need not possess abrasion resistance or mechanical strength as these properties are supplied to the system by the overlying cement layer. The first coating material forms a barrier layer over the surface of the vessel to which it is applied which layer is impervious to any fluid which may be later contained in or transported through the vessel. This material should be pliable, coherent, cohesive and not subject to cracking when stressed either in compression or tension. Suitable materials for the first coating include asphalt, asphalt paint, asphalt emulsified in water, bitumen, pitch, coal tar, coal-tar pitch, coal-tar resins such as coumarone-indene resins, mastic-like materials, epoxy resins and the like. The first coating should be from one sixty-fourth inch to one-sixteenth inch thick.

The second coating may be any hydraulic cement material such as portland cement, alumina cements, pozzolanic cement, mortar, gypsum cements and the like. The second coating should be from one-eighth inch to one-half inch thick. The thickness of the second coating depends on the size of the vessel being coated. In general, the larger the vessel the thicker the second coating. For example, in coating the interior of a 2 inch diameter conduit, a one-eighth inch thick second coating is satisfactory. For coating a 10 ¾ inch diameter conduit, a one-half inch thick second coating should be used.

Examples

Example 1

The internal surfaces of a steel tray 4 inch × 4 inch × ½ inch was given a ½-inch coating with a slurry containing 5 parts by weight mortar cement, 95 parts particulated sand having a particle size of 40 to 60 mesh and water to mix. The slurry was allowed to harden and cured wet at 140°F for 7 days. The tray was then stressed until there appeared in the bottom thereof a crack visible to the naked eye. The stress was then removed. The tray was covered with an aerated brine containing 5 percent sodium chloride and allowed to stand at ambient temperature for 3 weeks. The cement coating was then removed and the surface of the tray which had been exposed to the brine visually examined. The results of this examination are found in Table I.

Example 2

A second tray similar to that of Example 1 was coated with a one thirty-second inch layer of an asphalt paint known as DoCall 1150. The tray was then given a cement coating, stressed, exposed to brine, and examined as described in Example 1.

Examples 3 to 12

Two and one-half inch long segments of 1-inch diameter butt welded mild steel pipe were internally coated with cement as described in Example 1. In addition, some of the pipe segments were given an initial coating of a mastic-like material before being coated with cement. After the cement had set stress was applied to the exterior of the pipe with a vise-like apparatus until there formed on the interior coated surface of the pipe, cracks visible to the naked eye. This stress was maintained for the duration of the test period to ensure that the cracks remained open. The coated surface of the specimens was then exposed to aerated brine as described in Example 1.

TABLE I

LABORATORY TESTS OF CEMENTED COATED VESSELS EXPOSED TO BRINE

| Example | Exposure Time | Vessel | Mastic Coating | Results |
|---|---|---|---|---|
| 1 | 21 days | Tray | None | Isolated corrosion along base of crack |
| 2 | 21 days | Tray | Asphalt Paint | No evidence of corrosion |
| 3 | 60 days | Pipe | None | Isolated corrosion along base of crack* |
| 4 | 60 days | Pipe | Asphalt Paint | No evidence of corrosion |
| 5 | 60 days | Pipe | Roofing tar | No evidence of corrosion |
| 6 | 60 days | Pipe | Solvent and Tar | No evidence of corrosion |
| 7 | 6 months | Pipe | None | Extended corrosion along base of crack** |
| 8 | 6 months | Pipe | Roofing tar | No evidence of corrosion |
| 9 | 6 months | Pipe | Asphalt Paint | No evidence of corrosion |
| 10 | 1 year | Pipe | None | Isolated corrosion along base of crack*** |
| 11 | 1 year | Pipe | Roofing tar | No evidence of corrosion |
| 12 | 1 year | Pipe | Asphalt Paint | No evidence of corrosion |

*Corrosive attack 1 mil deep and 1.75 mms wide.
**Corrosive attack 4 mils deep and 6 mms wide.
***Corrosive attack 2 to 3 mils deep and 3 mms wide.

The results of these tests show that when only a cement coating is used corrosion occurs under cracks in the cement, whereas, if a mastic-like material is present between the cement and the metal vessel, no such corrosion occurs.

Field Examples 13 to 16

The interior of four sections of 2 ⅜-inch diameter welded steel pipe 5 feet in length and having no corrosion susceptible zone was sandblasted and washed with a hydrocarbon solvent. A one thirty-second inch thick coating of asphalt roofing cement was applied to a 2 ½-foot long segment of the interior of each of the pipe sections with the remainder of each section left bare. A one-fourth inch coating of cement mortar was then applied to the entire interior of each pipe section using the centrifugal casting method of application. The control sections were steam cured for 16 hours. The cement lining of two of the coated pipe sections was deliberately cracked by applying a vise-like apparatus both to the exterior of the segment of the section containing the asphalt undercoating and to the segment not containing the asphalt undercoating. The stress was maintained throughout the test period to insure that the cracks remained open. One cracked and one uncracked section was placed in service in the field flow line of the sour Skaggs pool waterflood system near Hobbs, New Mexico. Floodwater flowed through this pipe at the rate of about 1,000 barrels per day. Another pair of cracked and uncracked sections were placed in the surface flow line of the sweet Southeast Eureka waterflood system near Cherokee, Okla. Floodwater flowed through this pipe at the rate of about 500 barrels per day. Each of these waterflood systems has had a history of causing corrosion in cement-lined pipe.

TABLE II

FIELD TESTS OF CEMENT COATED PIPE HANDLING WATERFLOOD FLUID FOR ONE YEAR

| Example | Waterflood Fluid | Condition of Cement Coating | Mastic Coating | Results |
|---|---|---|---|---|
| 13 | Skaggs Field | Uncracked | Present | No rust or corrosion |
| 13A | Skaggs Field | Uncracked | None | Rust stain under cement — no corrosion |
| 14 | Skaggs Field | Cracked | Present | No rust or corrosion |
| 14A | Skaggs | Cracked | None | Rust stain |

TABLE II-Continued

FIELD TESTS OF CEMENT COATED PIPE HANDLING WATERFLOOD FLUID FOR ONE YEAR

| Example | Waterflood Fluid | Condition of Cement Coating | Mastic Coating | Results |
|---|---|---|---|---|
| | Field | | | under cement — one mil pit beneath crack |
| 15 | Southeast Eureka Field | Uncracked | Present | No rust or corrosion |
| 15A | Southeast Eureka Field | Uncracked | None | Rust spots under cement — no corrosion |
| 16 | Southeast Eureka Field | Cracked | Present | No rust or corrosion |
| 16A | Southeast Eureka Field | Cracked | None | Rust spots under cement — 2 mil pit beneath crack |

The results of these tests show that the mastic coating prevented corrosion of the pipe even when the cement coating was cracked.

It is to be understood that the foregoing discussion, description and examples are only intended to illustrate the invention. Numerous changes can be made which will readily suggest themselves to those skilled in the art and which are encompassed within the spirit of the invention disclosed and claimed herein.

I claim:

1. A coated metal vessel consisting essentially of a layer of asphalt in contact with the interior surface of said metal vessel and a layer of portland cement in contact with the layer of asphalt.

2. A method of coating a metal vessel consisting essentially of:
   a. applying to the interior surface of said metal vessel a layer of asphalt, and
   b. applying on top of the layer of asphalt a layer of portland cement slurry.

3. A method of lining the interior surface of a metal conduit consisting essentially of:
   a. applying to said surface a layer of asphalt, and
   b. applying on top of the layer of asphalt a layer of portland cement slurry by the centrifugal casting technique.

* * * * *